United States Patent [19]

Kabe et al.

[11] Patent Number: 4,715,420

[45] Date of Patent: Dec. 29, 1987

[54] PNEUMATIC TIRE FOR PASSENGER CAR

[75] Inventors: Kazuyuki Kabe; Tuneo Morikawa, both of Hiratsuka, Japan

[73] Assignee: The Yokohama Rubber Co., Ltd., Tokyo, Japan

[21] Appl. No.: 873,092

[22] Filed: Jun. 4, 1986

Related U.S. Application Data

[63] Continuation of Ser. No. 609,118, May 11, 1984.

[30] Foreign Application Priority Data

Jun. 13, 1983 [JP] Japan ............... 58-104263

[51] Int. Cl.$^4$ .............................................. B60C 9/06
[52] U.S. Cl. ................................. 152/557; 152/559
[58] Field of Search ............... 152/535, 548, 552, 557, 152/558, 559

[56] References Cited

U.S. PATENT DOCUMENTS

| | | | |
|---|---|---|---|
| 2,990,870 | 7/1961 | Vittorelli | 152/356 R |
| 3,245,454 | 4/1966 | Lewis | 152/354 |
| 3,498,355 | 3/1970 | Sperberg | 152/357 |
| 3,630,258 | 12/1971 | Sperberg | 152/359 |
| 4,257,469 | 3/1981 | Uemura | 152/359 |
| 4,469,157 | 9/1984 | Morikawa et al. | 152/361 R |
| 4,585,045 | 4/1986 | Morikawa et al. | 152/557 X |

FOREIGN PATENT DOCUMENTS 114704 7/1982 Japan .

Primary Examiner—Donald E. Czaja
Assistant Examiner—Ramon R. Hoch
Attorney, Agent, or Firm—Finnegan, Henderson, Farabow, Garrett & Dunner

[57] ABSTRACT

In a pneumatic tire of the type which consists of a pair of right and left beads; a pair of right and left side walls continuing the beads, respectively, and a tread interposed between the side walls, and in which a carcass cord layer is spread between the beads, and at least two layers consisting of a belt reinforcing layer whose reinforcing cords have a cord angle of from 15° to 30° with respect to the circumferential direction of the tire and a belt reinforcing layer whose reinforcing cords have a cord angle of from 150° to 165° with respect to the tire circumferential direction, are laminated and disposed between the tread and the carcass cord, a pneumatic tire for a passenger car characterized in that the carcass cord layer has a two-layered laminate structure consisting of upper and lower carcass cord layers; the angle of reinforcing cords constituting each of the carcass cord layers with respect to the tire circumferential direction, when measured from the side in which the angle of the reinforcing cords of the belt reinforcing layer on the contact side with the carcass cord layer describes an acute angle with respect to the tire circumferential direction, is such that the mean value $\frac{1}{2}(\alpha_1+\alpha_2)$ of the angle $\alpha_2$ of the reinforcing cords of the carcass cord layer on the contact side with the belt reinforcing layer and the angle $\alpha_1$ of the reinforcing cords of the carcass cord layer below the former is from 96° to 108° and their difference $(\alpha_2-\alpha_1)$ is from 10° to 40°; the upper carcass cord layer consists of nylon fibers while the lower carcass cord layer consists of polyester fibers; and both ends of the upper and lower carcass cord layers are turned up around the bead wires, respectively.

2 Claims, 10 Drawing Figures

PNEUMATIC TIRE FOR PASSENGER CAR

This application is a continuation of application Ser. No. 609,118, filed May 11, 1984.

BACKGROUND OF THE INVENTION

This invention relates generally to a pneumatic tire, and more particularly to a pneumatic tire for a passenger car which reduces ply steer of the tire to improve straight running stability and drastically, driving comfortability.

A radial tire for a passenger car in accordance with the prior art generally has a construction in which a belt reinforcing layer consisting of at least two layers is interposed between a tread and a carcass cord layer. Reinforcing cords of one of these belt reinforcing layers have a cord angle of from 15° to 30° with respect to the circumferential direction of the tire while the reinforcing cords of the other have a cord angle of from 150° to 165° with respect to the tire circumferential direction, and these reinforcing cords cross one another. The carcass cord layer consists of one or two layers, and the cords of each layer are disposed at angle of about 90° with respect to the tire circumferential direction. In comparison with a bias tire, the radial tire of this kind is more excellent in the aspects of brake performance, low fuel consumption and wear resistance due to the effect brought forth by the belt reinforcing layers, but has a problem in that straight running stability is lower due to the belt reinforcing layers. In other words, when the radial tire rotates and advances, a lateral force occurs either to the right or left to the advancing direction, even if a slip angle is zero, so that a car advances in a direction different from the direction in which the driver of the car wishes to drive the car.

Generally, the lateral force with the zero slip angle consists of force components resulting from two different mechanisms. One is called "conicity" (CT) with the other being called "ply steer" (PS), and they are classified as part of the uniformity characteristics of the tire. On the other hand, in accordance with a uniformity test method (JASO C607) for a car tire, the conicity CT and the ply steer PS are expressed by the following equation from their definition where LFD represents the mean value of the lateral force when the tire rotates once, LFDw represents the value when measured on the face and LFDs represents the value when measured on the reverse by changing the position of the tire:

$$LFDw = PS + CT \quad (1)$$

$$LFDs = PS - CT \quad (2)$$

PS and CT can be obtained as follows from equation (1) and (2):

$$CT = \frac{LFDw - LFDs}{2} \quad (3)$$

$$PS = \frac{LFDw + LFDs}{2} \quad (4)$$

Each relation between (1) through (4) is illustrated in FIG. 1.

Among the conicity and the ply steer described above, the conicity is believed to be a force that is generated because the tire shape is geometrically asymmetric with respect to the center of the circumferential direction of the tire, that is, a force that is generated when the tire assuming the shape of a circular truncated cone rolls. The main reason for the occurrence of this force is the position of the belt reinforcing layer inserted into the tread of the tire, and hence can be reduced by somehow improving the production procedures. In contrast, the ply steer is a force that is inherent to the structure of the belt reinforcing layer, and can not be drastically reduced in practice unless the structure itself of this belt reinforcing layer is changed.

Let's consider the belt reinforcing layer. The belt reinforcing layer can be expressed as a two-layered laminate sheet 50 consisting of belt reinforcing layers 50u and 50d, as depicted in FIG. 2(A). It is well known in the art that when a tensile force is caused to act upon this two-layered laminate sheet 50 in the tire circumferential direction EE', the two-layered laminate sheet 50 undergoes not only deformation inside the two-dimensional plane on which the tensile force acts but also twist deformation three-dimensionally of the plane as depictied in FIG. 2(B). The ply steer described above results from this twist deformation of the belt reinforcing layer.

Various proposals have been made in the past so as to reduce the ply steer by adding a new belt reinforcing layer to the existing belt reinforcing layer, but the addition of the new belt reinforcing layer is not much desirable because it deteriorates the characterizing features of the radial tire such as its low fuel consumption, and the like.

The inventors of the present invention made intensive studies in order to eliminate the problem described above, and as a result, proposed previously a pneumatic tire (Japanese Patent Laid-Open No. 114704/1982). In the pneumatic tire of this prior patent application which is equipped with the belt reinforcing layer of the structure described above and with a carcass cord layer consisting of upper and lower two layers, the angle of reinforcing cords constituting each carcass cord layer with respect to the tire circumferential direction, when measured from the side in which the reinforcing cords of the belt reinforcing layer on the contact side with the carcass cord layer describe an acute angle with respect to the tire circumferential direction, is such that the mean value $\frac{1}{2}(\alpha_1 + \alpha_2)$ of the angle $\alpha_2$ of the reinforcing cords of the carcass cord on the contact side with the belt reinforcing layer and the angle $\alpha_1$ of the reinforcing cords of the carcass cord below the former is from 96° to 108° and their difference $(\alpha_2 - \alpha_1)$ is from 10° to 40°. According to this arrangement, the ply steer can be reduced without adding afresh any belt reinforcing layer, and straight running stability due to the belt reinforcing layer can be improved drastically.

However, when the reinforcing cords of each carcass cord layer are arranged to cross one another at a predetermined angle in the tire circumferential direction in order to improve the straight running stability as described above, another problem develops in that the reinforcing cords of each carcass cord layer are cut due to compression, particularly when driving at a low internal pressure of the tire.

SUMMARY OF THE INVENTION

It is therefore an object of the present invention to provide a pneumatic tire for a passenger car which eliminates the problem described above, improves the straight running stability and driving comfortability, and drastically durability particularly when driving at a low internal tire pressure.

In a pneumatic tire of the type which consists of a pair of right and left beads, a pair of right and left side walls containing the beads, respectively, and a tread interposed between the side walls, and in which a carcass cord layer is spread between the beads, and at least two layers consisting of a belt reinforcing layer whose reinforcing cords have a cord angle of from 15° to 30° with respect to the circumferential direction of the tire and a belt reinforcing layer whose reinforcing cords have a cord angle of from 150° to 165° with respect to the circumferential direction of the tire, are laminated and disposed between the tread and the carcass cord layer, the pneumatic tire for a passenger car to accomplish the object of the invention described above has a construction in which the carcass cord layer has a two-layered laminate structure consisting of upper and lower carcass cord layers; the angle of reinforcing cords constituting each carcass cord layer with respect to the tire circumferential direction, when measured from the side in which the angle of the reinforcing cords of the belt reinforcing layer on the contact side with the carcass cord layer describes an acute angle with respect to the tire circumferential direction, is such that the mean value $\frac{1}{2}(\alpha_1+\alpha_2)$ of the angle $\alpha_2$ of the reinforcing cords of the carcass cord on the contact side with the belt reinforcing layer and the angle $\alpha_1$ of the reinforcing cords of the carcass cord layer below the former is from 96° to 108° and their difference $(\alpha_2-\alpha_1)$ is from 10° to 40°; the upper carcass cord layer consists of nylon fibers while the lower carcass cord layer consists of polyester fibers; and both ends of the upper and lower carcass cord layers are turned up around the bead wires, respectively.

DESCRIPTION OF THE PREFERRED EMBODIMENTS

Hereinafter, the construction of the present invention will be described in detail with reference to one embodiment thereof shown in the accompanying drawings.

Figure 1:
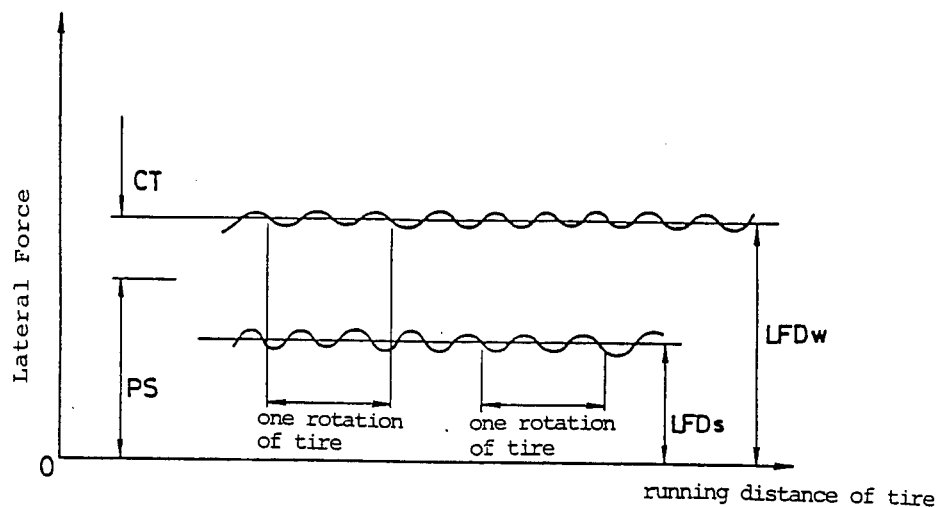
FIG. 1 is a diagram showing the relation between the driving distance of a radial tire and a lateral force.
Figure 2A:
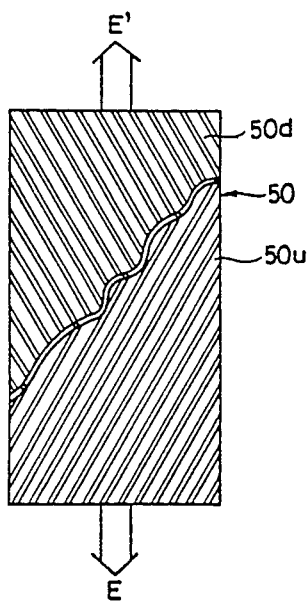
FIGS. 2(A) and 2(B) are model views showing the state of deformation of a belt reinforcing layer.
Figure 2B:
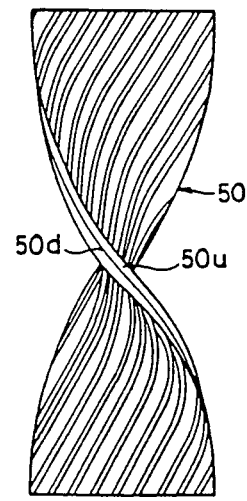
Figure 3:
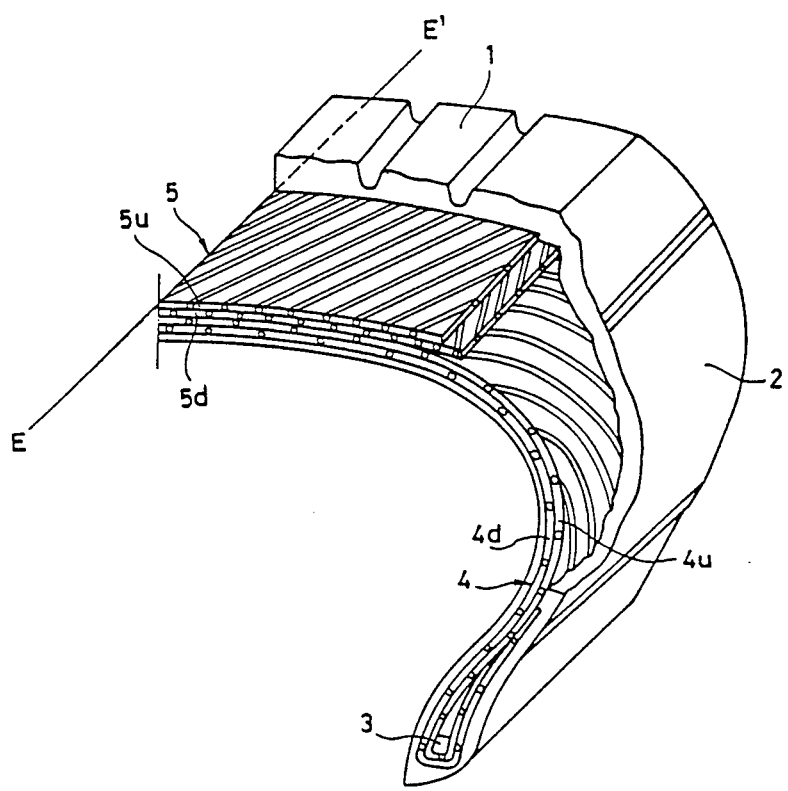
FIG. 3 is a semi-sectional perspective view of a conventional pneumatic tire.

FIG. 3 is a semi-sectional perspective view of a pneumatic tire in accordance with the prior art. In the drawing, reference numeral 1 represents a tread and reference numeral 2 represents side walls that extend from both sides of the tread 1. Reference numeral 3 represents bead wires embedded into the lower end portions of the side walls along the circumferential direction. A carcass cord layer 4 is disposed in such a manner as to wrap the bead wires 3 at both end portions and to extend along the inner surfaces of the side walls and the inner surface of the tread 1. A belt reinforcing layer 5 consisting of steel cords is interposed between the carcass cord layer 4 and the tread 1. The carcass cord layer 4 has a two-layered laminate structure consisting of an upper carcass cord layer 4u and a lower carcass cord layer 4d, and the belt reinforcing layer 5 has also a two-layered laminate structure consisting of an upper belt reinforcing layer 5u and a lower belt reinforcing layer 5d.

Among the two layers that constitute the belt reinforcing layer 5, the cord angle of the reinforcing cords of the upper belt reinforcing layer 5u is from 150° to 165° with respect to the tire circumferential direction EE', and the cord angle of the reinforcing cords of the lower belt reinforcing layer 5d is from 15° to 30° with respect to the tire circumferential direction. The reinforcing cords of the upper and lower belt reinforcing layers 5u, 5d cross one another.

Figure 4:
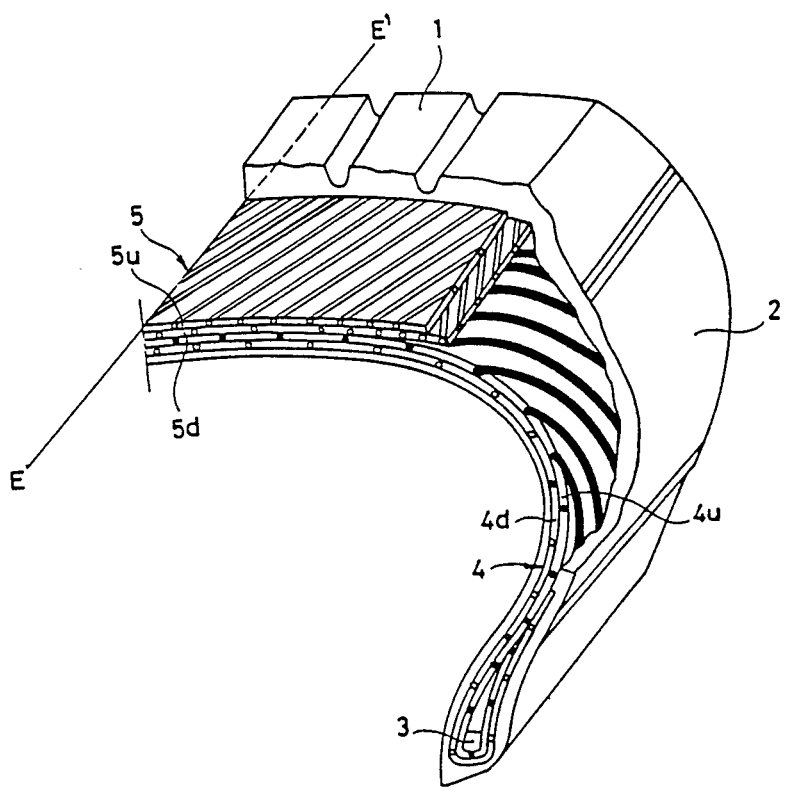
FIG. 4 is a semi-sectional perspective view of an example of the pneumatic tire of the present invention.
Figure 5:
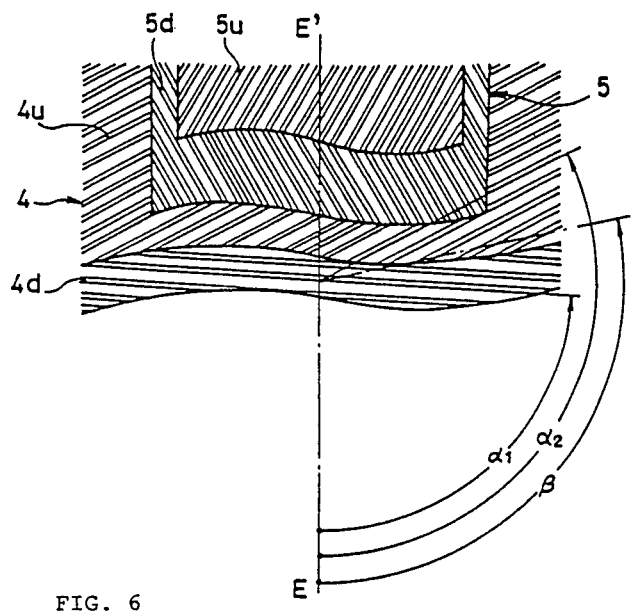
FIG. 5 is an exploded plan view of the belt reinforcing layer and carcass cord layer of the pneumatic tire of FIG. 4.
Figure 6:
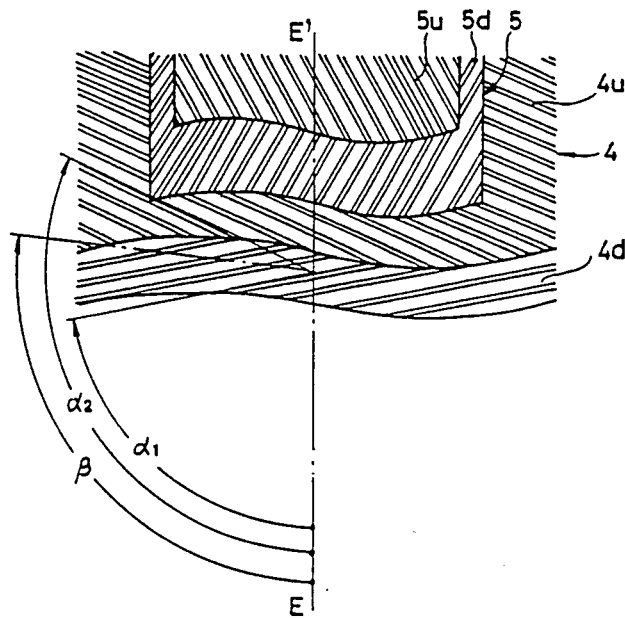
FIG. 6 is also an exploded plan view of another embodiment of the invention.

In the pneumatic tire such as shown in FIG. 3, the present invention particularly stipulates the carcass cord layer. This embodiment will be described with reference to FIGS. 4 through 8. FIGS. 4 and 5 are semi-sectional perspective views of the pneumatic tire in accordance with the present invention, FIG. 4 is a transverse sectional view of the right half of the pneumatic tire, and FIGS. 5 and 6 are exploded plan views of the belt layers and carcass cord layers of the pneumatic tire.

(1) The cord angle of the reinforcing cords constituting the carcass cord layer 4 with respect to the tire circumferential direction is one of the important factors to reduce the ply steer. Therefore, the cords must be arranged so as to satisfy the following condition.

The cord angles of the reinforcing cords of the upper and lower carcass cord layers 4u, 4d forming the carcass cord layer 4 with respect to the tire circumferential direction are measured from the side in which the reinforcing cords of the lower belt reinforcing layer 5d on the contact side with the carcass cord layer 4 described an acute angle with respect to the tire circumferential direction. The mean value $\beta=\frac{1}{2}(\alpha_1+\alpha_2)$ of the angle $\alpha_1$ of the reinforcing cords of the lower carcass cord layer 4d and the angle $\alpha_2$ of the reinforcing cords of the upper carcass layer 4u must be from 96° to 108°, while their difference $(\alpha_2-\alpha_1)$ must be from 10° to 40°. Since these angles $\alpha_1$ and $\alpha_2$ are measured from the side in which the reinforcing cords of the lower belt reinforcing layer 5d on the contact side with the carcass cord layer 4 describe an acute angle with respect to the tire circumferential direction EE', they must be measured clockwise in the rotating direction with respect to the tire circumferential direction EE', if the reinforcing cords of the lower belt reinforcing layer 5d are arranged leftwardly downward as shown in FIG. 6.

As is obvious from the relation of the angles $\alpha_1$ and $\alpha_2$ described above, the reinforcing cords of the upper carcass cord layer 4u must be disposed so that their cord angle $\alpha_2$ is greater than that $\alpha_1$ of the reinforcing cords of the lower carcass cord layer 4d and moreover, they cross one another. Since the mean value $\beta$ of these angles $\alpha_1$ and $\alpha_2$ is from 96° to 108°, the ply steer that results from the twist deformation of the belt reinforcing layer 5 can be reduced without adding afresh any belt reinforcing layer, the straight running stability of the tire can be improved and handling and stability is enhanced.

If $\beta$ is below 96°, the ply steer can not be much improved when compared with that of the conventional radial tire, and if it is above 108°, the ply steer can be further improved, it is true, but driving comfortability drops to a level lower than that of the conventional radial tire. Even if the mean value $\beta$ is within the range of from 96° to 108°, however, the difference $(\alpha_2 - \alpha_1)$ must be from 10° to 40°. If the difference $(\alpha_2 - \alpha_1)$ is from 10° to 40°, the rigidity at the carcass portion can be improved in comparison with a so-called radial tire in which two-layered carcass cord layers are disposed parallel in the tire sectional direction, and higher handling and stability can be enjoyed. If the difference $(\alpha_2 - \alpha_1)$ is below 10°, the carcass rigidity becomes insufficient and the handling and stability drops undesirably. If the difference $(\alpha_2 - \alpha_1)$ is above 40°, the load durability in the heavy road running drops, although the ply steer can be improved. (2) The upper carcass cord layer 4u consists of nylon fibers while the lower carcass cord layer 4d consists of polyester fibers.

The reason is as follows. When the carcass angle is measured before and after vulcanization to compare the change by employing the carcass structure described in item (1) above, it is confirmed that the change quantity of the carcass angle of the upper carcass cord layer is greater by as large as 4° to 8° than that of the carcass angle of the lower carcass cord layer 4d. This means that a greater tensile force acts upon the carcass cords of the upper carcass cord layer 4u than upon the carcass cords of the lower carcass cord layer 4d. In order to make uniform the tensile forces acting upon the upper and lower carcass cord layers 4u and 4d in the carcass structure described in the item (1) above, therefore, it would be possible, in principle, to use fiber cords having a higher modulus for the lower carcass cord layer 4d than those for the upper carcass cord layer 4u. The inventors of the present invention produced various pneumatic tires for a passenger car by using various combinations of carcass cords and evaluated their performance. As a result, the inventors found that the cord tension of the upper and lower carcass cord layers could be made uniform when nylon fibers were used for the carcass cords of the upper carcass cord layer 4u and the polyester fibers, for the lower carcass cord layer 4d.

If the upper and lower carcass cord layers 4u and 4d are thus made of the nylon and polyester fibers, respectively, as described above, the cord tension of each carcass cord layer 4u, 4d can be made uniform, so that the impact force from the tire tread during rotation can be absorbed by the carcass cord layers as a whole, and driving comfortability can be improved. (3) Both ends of the upper and lower carcass cord layers are turned up around the bead wires.

In the embodiment shown in FIG. 4, both ends of both upper and lower carcass cord layers 4u and 4d are turned up around the bead wires 3 from the inside to the outside of the tire and anchored to the bead wires 3. However, it is also possible to turn up, for example, both ends of the lower carcass cord layer from inside to the outside of the tire and both ends of the upper carcass cord layer from outside to the inside of the tire around the bead wires 3, and then to anchor them to the bead wires 3, respectively.

Although the embodiment described above uses the belt reinforcing layer 5 which is a two-layered laminate structure consisting of steel cords, it is possible to use various heretofore known belt reinforcing layers such as one consisting of a steel belt reinforcing layer and an aromatic polyamide fiber cord belt reinforcing layer known as "Kevlar" in the trade name, and a belt reinforcing layer consisting of two textile cord belt reinforcing layers. The end portions of the belt reinforcing layers may be naturally bent inward. The present invention can be applied also to such a belt reinforcing layer to which an additional belt reinforcing layer of other textile cords is added to the existing two belt reinforcing layers, whenever necessary.

Next, the present invention will be described in further detail with the following definite experimental example thereof.

EXPERIMENTAL EXAMPLE

Figure 7:
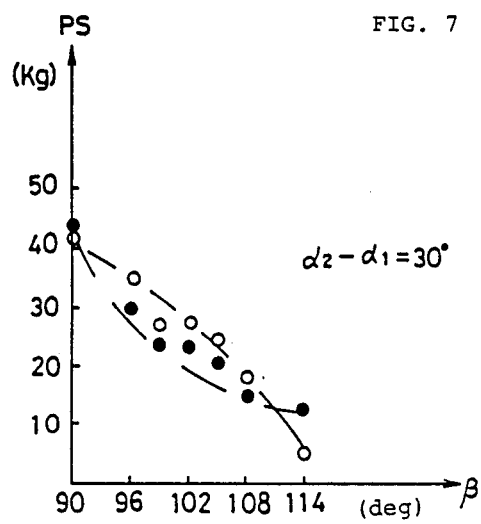
FIG. 7 is a diagram showing the relation between ply steer and an angle mean value $\beta$.

In a pneumatic tire having the structural form of the invention shown in FIG. 4, various pneumatic tires were produced by keeping the difference of the cord angles $(60_2 - \alpha_1)$ of the upper and lower carcass cord layers constant at 30°, but changing variously the mean angle value $\beta$ within the range of from 90° to 114°. The cord angles of the upper and lower belt reinforcing layers with respect to the tire circumferential direction were 20° and 160°, respectively. The tire size was 195/70HR14 and the rim was $5\frac{1}{2}$ — JJ × 14. The ply steer of these pneumatic tires was measured in accordance with the uniformity test method JASO C607 for a passenger car, with the results shown in FIG. 7. In FIG. 7, symbol O represents the result of the pneumatic tires using the nylon fibers for the carcass cords of both upper and lower carcass cord layers 4u, 4d as Comparative Examples, while symbol ● represents the results of the pneumatic tires in accordance with the present invention.

Figure 8:
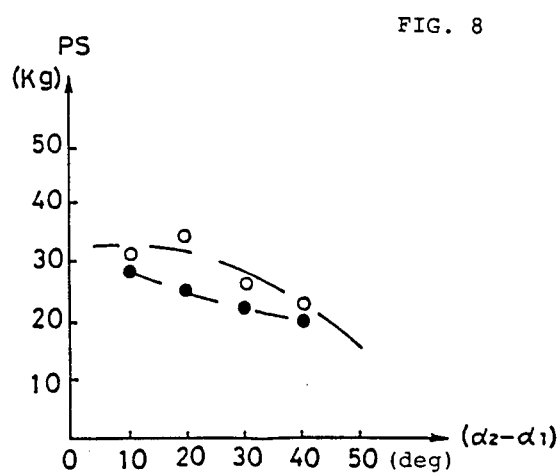
FIG. 8 is a diagram showing the relation between the ply steer and an angle difference $(\alpha_2-\alpha_1)$.

Similarly, FIG. 8 illustrates the results of an experiment in which the mean value $\beta$ of the cord angles of the upper and lower carcass cord layers was kept constant at 102° but the difference $(\alpha_2 - \alpha_1)$ of these cord angles were changed variously within the range of from 10° to 40°. Symbols O and ● have the same meaning as described above.

Next, a cleat impact test was conducted for each of the tires used in the experiments shown in FIGS. 7 and 8 using an indoor drum tester consisting of a drum of a 2500 mm diameter.

Figure 9:
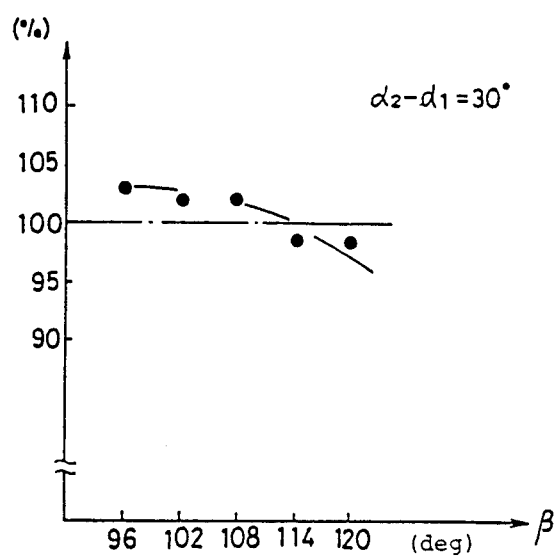
FIG. 9 is a diagram showing the relation between driving comfortability and the angle mean value $\beta$.

FIG. 9 illustrates the impact force of the present tires (represented by ●) in the longitudinal direction with the impact force of the pneumatic tires of Comparative Example being indexed as 100%. In FIG. 9, the ordinate represents the reciprocal of the percent impact force at the time of over-riding the cleat in the longitudinal direction. Measurement was made at an air pressure of 1.9 kg/cm$^2$, a load of 520 kg and speeds of 50 Km/hr, 60 km/hr and 70 km/hr. It can be seen from FIG. 9 that the impact force of the present tires is smaller than that of the tires of Comparative Example.

As can be seen clearly from FIGS. 7 through 9, the pneumatic tire of the present invention is superior to the conventional pneumatic tires in the aspects of straight running stability and driving comfortability.

The present invention reduces the ply steer resulting from the belt reinforcing layer when compared with the conventional pneumatic tire, improves straight running stability and further improves driving comfortability, as described above. Moreover, the present invention improves handling and stability and driving comfortability over the conventional pneumatic tires.

What is claimed is:

1. In a pneumatic tire of the type comprising a pair of right and left beads, a pair of right and left side walls containing said beads, respectively, a tread interposed between said side walls, a carcass cord layer spread between said beads, and at least two layers consisting of a belt reinforcing layer having reinforcing cords having a cord angle of from 15° to 30° with respect to the circumferential direction of the tire and a belt reinforcing layer having reinforcing cords having a cord angle of from 150° to 165° with respect to the circumferential direction of the tire, said belt reinforcing layers being laminated and disposed between said tread and said carcass cord layer, and said carcass cord layer having a two-layered laminate structure consisting of upper and lower carcass cord layers with each layer having reinforcing cords, the angle of said reinforcing cords of each of said carcass cord layers with respect to the circumferential direction of the tire, when measured from the side in which the angle of the reinforcing cords of said belt reinforcing layer on the contact side with said carcass cord layer describes an acute angle with respect to the circumferential direction of the tire, is such that the mean value $\frac{1}{2}(\alpha_1+\alpha_2)$ of the angle $\alpha_2$ of the reinforcing cords of said upper carcass cord adjacent said belt reinforcing layer and the angle $\alpha_1$ of the reinforcing cords of said lower carcass cord layer is from 96° to 108° and their difference $(\alpha_2-\alpha_1)$ is from 10° to 40°, and said upper carcass cord layer comprising reinforcing cords of nylon fibers and said lower carcass cord layer comprising reinforcing cords of polyester fibers with tension of said cords of both upper and lower carcass cord layers being substantially uniform.

2. The tire of claim 1 wherein both ends of both said upper and lower carcass cord layers are turned up around said beads in a direction inside to outside of said tire.

* * * * *